(12) United States Patent
    Beltran et al.

(10) Patent No.: US 9,625,898 B2
(45) Date of Patent: Apr. 18, 2017

(54) FEEDBACK CONTROL SYSTEM HAVING SERVOMECHANISM MONITORING SYSTEM AND METHODS OF MONITORING SERVOMECHANISMS

(71) Applicant: HONDA MOTOR CO., LTD., Tokyo (JP)

(72) Inventors: Hugo Beltran, Dublin, OH (US); James Foley, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/673,061

(22) Filed: Mar. 30, 2015

(65) Prior Publication Data

US 2015/0277443 A1    Oct. 1, 2015

Related U.S. Application Data

(60) Provisional application No. 61/973,026, filed on Mar. 31, 2014.

(51) Int. Cl.
    *G05B 9/02*     (2006.01)
    *G05B 19/4062*  (2006.01)

(52) U.S. Cl.
    CPC ................. *G05B 19/4062* (2013.01)

(58) Field of Classification Search
    CPC .................................. G05B 19/4062
    USPC ........................................... 318/566
    See application file for complete search history.

(56) References Cited

U.S. PATENT DOCUMENTS

| 4,904,911 | A |   | 2/1990  | Toyoda et al. |
|-----------|---|---|---------|----------------|
| 5,088,045 | A |   | 2/1992  | Shimanaka et al. |
| 5,602,689 | A | * | 2/1997  | Kadlec ............... G11B 5/5534 360/78.04 |
| 5,621,289 | A |   | 4/1997  | Doyama |
| 6,543,414 | B2|   | 4/2003  | O'Neil et al. |
| 7,096,569 | B1|   | 8/2006  | Barr et al. |
| 7,593,796 | B2|   | 9/2009  | Prokhorov |
| 7,638,964 | B2|   | 12/2009 | Abe et al. |
| 7,694,576 | B2|   | 4/2010  | Michel |
| 7,874,058 | B2|   | 1/2011  | Kodo et al. |
| 2002/0158359 | A1 |   | 10/2002 | Matsubayashi et al. |
| 2008/0243434 | A1 |   | 10/2008 | Boutin |
| 2008/0272725 | A1 |   | 11/2008 | Bojrup et al. |
| 2009/0200978 | A1 |   | 8/2009  | Kato et al. |
| 2011/0054660 | A1 | * | 3/2011  | Kiesler ............... B29C 65/08 700/110 |
| 2011/0179627 | A1 |   | 7/2011  | Kondo et al. |
| 2011/0221377 | A1 | * | 9/2011  | Ueno ............... G05B 19/4062 318/565 |
| 2012/0111207 | A1 |   | 5/2012  | Kuboe |

(Continued)

FOREIGN PATENT DOCUMENTS

JP          06292379         10/1994

*Primary Examiner* — Erick Glass
(74) *Attorney, Agent, or Firm* — Armstrong Teasdale LLP

(57) ABSTRACT

A feedback control system includes at least one servo unit controlling operation of a motor, wherein the at least one servo unit is configured to acquire operational data with respect to controlling the operation of the motor. The feedback control system also includes a programmable logic controller communicatively coupled to the at least one servo unit, wherein the programmable logic controller is configured to receive the operational data from the at least one servo unit and output real-time data corresponding to the operational data.

20 Claims, 5 Drawing Sheets

(56) References Cited

U.S. PATENT DOCUMENTS

| | | |
|---|---|---|
| 2013/0187589 A1 | 7/2013 | Okita et al. |
| 2013/0197757 A1 | 8/2013 | Ellis |
| 2013/0241460 A1* | 9/2013 | Ushiyama .......... G05B 19/4062 318/565 |
| 2013/0253670 A1 | 9/2013 | Chung et al. |

* cited by examiner

FEEDBACK CONTROL SYSTEM HAVING SERVOMECHANISM MONITORING SYSTEM AND METHODS OF MONITORING SERVOMECHANISMS

CROSS REFERENCE TO RELATED APPLICATIONS

This application claims the benefit of U.S. Provisional Application No. 61/973,026 filed Mar. 31, 2014, the subject matter of which is herein incorporated by reference in its entirety.

BACKGROUND

Industrial and assembly-type operations, such as automotive production lines, typically include a number of assembling or machining stations. One or more workpieces, such as parts of a vehicle to be assembled or machined are moved along the production line with transport units that can move in one or more different directions using servomechanisms (also referred to as servos) that have operating limits. Depending on the operation being performed, or the particular part being moved (which can vary as a result of automotive production lines being designed to assemble and machine automobiles of different types), one or more of the operating limits may be exceeded. It is desirable to maintain the operation within the operating limits, which can reduce the likelihood of failure or of a shortened life of the servos.

BRIEF DESCRIPTION

In one embodiment, a feedback control system includes at least one servo unit controlling operation of a motor, wherein the at least one servo unit is configured to acquire operational data with respect to controlling the operation of the motor. The feedback control system also includes a programmable logic controller communicatively coupled to the at least one servo unit, wherein the programmable logic controller is configured to receive the operational data from the at least one servo unit and output real-time data corresponding to the operational data.

In another embodiment, a monitoring method includes acquiring operational data directly from one or more servo units and monitoring the one or more servo units using a programmable logic controller of a monitoring system associated with the servo unit in real-time using the acquired operational data.

DETAILED DESCRIPTION

Figure 1:
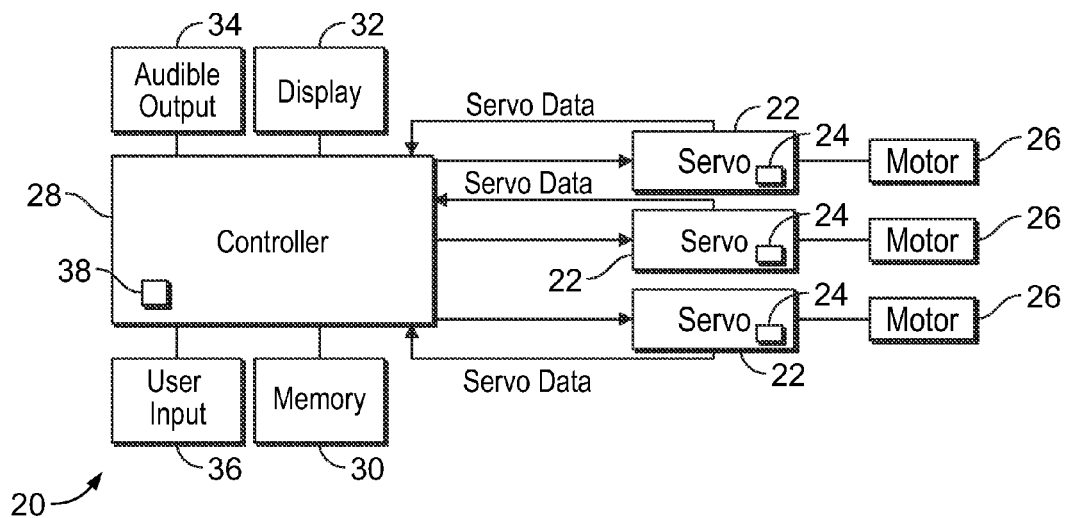
FIG. 1 is a block diagram of a monitoring system in accordance with an embodiment.

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers, or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "module", "system," or "unit," may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules, units, or systems shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of methods and systems for torque monitoring, such as torque monitoring of servos for different types of motors, for example, for controlling movement of transfer units that transfer a workpiece along an automobile production line are provided. It should be noted that although the various embodiments are described in connection with the automotive industry, such as for an automobile production process, one or more embodiments may be implemented in different industries and for different applications (e.g., airline industry). For example, one or more embodiments may be implemented in any type of servo system. Additionally, communication of information used in accordance with one or more embodiments may be performed with different types of communication protocols, as well as using different types of communication lines and communication buses.

One or more embodiments include a controller, implemented as a programmable logic controller (PLC), also referred to as a programmable logic circuit, that monitors one or more operating characteristics or parameters of a servo, and which may form part of a servo training unit as described in more detail herein. In some embodiments, the operating characteristics or parameters include at least one of the servo torque, servo speed, and servo position. However, different or additional operating characteristics or parameters may be monitored in accordance with one or more embodiments.

The controller in various embodiments monitors one or more operating limits, such as torque limit boundaries (e.g., torque threshold limits or ranges) and determines whether one or more servos are within the torque limit boundaries. For example, in some embodiments, torque limit feedback information is checked for a torque out of range condition. The feedback information used by one or more embodiments relates to the monitored operating characteristics or parameters. As an example, in one embodiment, the controller receives or acquires torque characteristic information of a servo axis and monitors the servo to determine when the operational torque is out of tolerance (or within a determined variance) from a reference torque value. The reference torque value may be manually set by an operator or technician, such as based on a known acceptable or "good" machine cycle and stored within a memory. In some embodiments, predetermined or predefined reference torque values may be provided based on historical data (such as for similar servos) and the user is able to confirm or modify the reference torque value. Additionally, it should be noted that the reference torque value may be different for different servos, such as within the same production process, and may be different for the same servo, such as based on the operation being performed (e.g., movement of parts for different automobile types). Thus, in operation, as the servo moves, such as in forward and reverse directions, operational data for the servo is compared to the reference value(s), which may be performed in real-time and displayed to a user (e.g., graphed on a human-machine interface (HMI) for visual indication). It also should be noted that the comparison may be performed continuously, periodically, or at different time intervals as desired or needed. If the operational data, such as the operational torque approaches the reference torque value (e.g., within as defined percentage of the reference torque value) or exceeds the reference torque value, a notification is provided (e.g., an audible and/or visual alarm).

In some embodiments, a PLC is programmed to (i) store different operational data, which in one embodiment includes threshold torque values, (ii) determine a current output torque of a servo motor, (iii) compare the current output torque to the threshold torque values; (iv) display a real-time graph or chart showing the current output torque and threshold torque values; and/or (v) control operation of the servo motor based on the current output torque. However, it should be appreciated that the various embodiment may be used to monitor different types of operational data and the various embodiments are not limited to monitoring torque data.

FIG. 1 illustrates a feedback control system 10 having a monitoring system 20 for one or more servo units 22 in accordance with an exemplary embodiment. The monitoring system 20 may be implemented for monitoring different operating characteristics or parameters (such as different types of operational data as described herein) of the servo units 22. In the illustrated embodiment, the servo units 22 include servo controllers 24 that operate to control corresponding servomotors 26. It should be noted that the servo units 22, servo controllers 24, and servomotors 26 may be separate components or integrated into a single component or assembly. It also should be noted that additional elements may be provided, such as servo amplifiers or other servo components, such as based on the particular application.

In various embodiments, a machine automation controller 28 is communicatively coupled to, and configured to control operation of, servo units 22. In an exemplary embodiment, the machine automation controller 28 is a PLC. Moreover, in an exemplary embodiment, the machine automation controller 28 is configured to monitor one or more operating characteristics or parameters of servo operation, such as by monitoring one or more of the servo units 22, servo controllers 24, and servomotors 26. In one embodiment, the controller 28 receives operating characteristics or parameters as servo data (e.g., operational data) acquired from the servo units 22. Thus, in the illustrated embodiment, the servo data, such as servo torque, servo speed, and servo position, is received directly from the servo units 22 without use of additional monitoring devices or sensors. For example, manual measurements with external devices are not performed in various embodiments. It should be noted that the servo data may be received from any of the servo components, for example, the servo controller 24 or servomotor 26.

In some embodiments, the controller 28 is configured as a servo training unit that monitors the torque output of each of the servo units 22 as determined from the received servo data. A memory subsystem 30 is coupled to the controller 28 to store the received data. It should be noted that the memory subsystem 30 may store other data, such as torque reference values as described in more detail herein. In one embodiment, a torque monitor feature is integrated into the controller 28 configured as servo training unit to monitor the torque output of each servo unit 22. In this embodiment, this output torque is compared to one or more defined (e.g., user programmed) reference values, such as upper and lower reference values with defined offsets. A user input 36 (e.g., keyboard or touchscreen) is coupled to the controller 28 to receive one or more user inputs, such as programmed reference torque values.

The controller 28 is configured to provide a notification, such as an audible or visual notification if the monitored torque value approaches or exceeds the reference values. It should be noted that different notifications (e.g. different levels of warnings) may be provided based on how close the monitored torque value is to the reference torque value or if the monitored torque value has exceeded the reference torque value. In the illustrated embodiment, a display 32 and an audible output device 34 (e.g., a speaker) are coupled to the controller 28 and may provide the visual and audible notifications, respectively. Furthermore, the controller 28 may control operation of servo unit 22 based on the comparison of the monitored torque value to the reference torque value, including, but not limited to, shutting down the servo unit 22. The display 32 may also present additional data to a user, such as a current monitored torque value and the defined torque value limits or thresholds.

The controller 28 may form part of or be embodied as one or more computing systems, such as one or more PLCs. It should be noted that while a particular computing or operating environment may be described herein, the computing or operating environment is intended to illustrate operations or processes that may be, implemented, performed, and/or applied to a variety of different computing or operating environments. Thus, FIG. 1 illustrates a non-limiting example of a controller or computing system that may perform one or more methods or processes as described in more detail herein. The controller 28 may be provided, for example, as any type of computing device, including, but not limited to PLCs or personal computing systems, among others.

In the illustrated embodiment, the controller 28 includes a logic subsystem 38 and a storage subsystem, illustrated as the memory subsystem 30. The memory subsystem 30 is operatively coupled to the logic subsystem 38 to allow access, for example, to reference operational values and stored monitored values. The monitoring system 20 may optionally include components not shown in FIG. 1, and/or some components shown in FIG. 1 may be peripheral components that do not form part of or are not integrated into the computing system.

The controller 28, including the logic subsystem 38, may include one or more physical devices configured to execute one or more instructions. For example, the controller 28 or logic subsystem 38 may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The controller 28 or logic subsystem 38 may include one or more processors and/or computing devices that are configured to execute software instructions, such as programmed using application software. In some embodiments, one or more algorithms as described herein are embedded into the PLC. Additionally or alternatively, the controller 28 or logic subsystem 38 may include one or more hardware or firmware logic machines configured to execute hardware or firmware instructions. The controller 28 or logic subsystem 38 may optionally include individual components that are distributed throughout two or more devices, which may be remotely located in some embodiments.

The memory subsystem 30 may include one or more physical devices (that may include one or more memory areas) configured to store or hold data (e.g., monitored operational data) and/or instructions executable by the controller 28 or logic subsystem 38 to implement one or more processes or methods described herein. When such processes and/or methods are implemented, the state of the controller 28 or logic subsystem 38 may be transformed (e.g., to store different data or change the stored data). The memory subsystem 30 may include, for example, removable media and/or integrated/built-in devices. The memory subsystem 30 also may include, for example, other devices, such as optical memory devices, semiconductor memory devices (e.g., RAM, EEPROM, flash, etc.), and/or magnetic memory devices, among others. The memory subsystem 30 may include devices with one or more of the following operating characteristics: volatile, nonvolatile, dynamic, static, read/write, read-only, random access, sequential access, location addressable, file addressable, and content addressable. In some embodiments, the controller 28, logic subsystem 38, and the memory subsystem 30 may be integrated into one or more common devices, such as a PLC, an application specific integrated circuit or a system on a chip. Thus, the memory subsystem 30 may be provided in the form of computer-readable removable media in some embodiments, which may be used to store and/or transfer data and/or instructions executable to implement the various embodiments described herein, including the processes and methods.

In various embodiments, the user inputs 36 may include, for example, a keyboard, mouse, or trackball, among others. However, it should be appreciated that that other user inputs 36, such as other external user input devices or peripheral devices as known in the art may be used. A user is able to interface or interact with the monitoring system 20 using the one or more user input 36 (e.g., select or input data).

Additionally, in various embodiments, the display 32 (e.g., a monitor) may be provided to display information of data (e.g., one or more graphs) as described herein. For example, the display 32 may be used to present a visual representation of an output, such as monitored torque values and threshold values. In operation, the processes and/or methods described herein change the data stored by the memory subsystem 30, and thus transform the state of the memory subsystem 30. The state of the display 32 may likewise be transformed to visually represent changes in the underlying data. The display 32 may include one or more display devices and may be combined with the controller 28, logic subsystem 38 and/or the memory subsystem 30, such as in a common housing, or such display devices may be separate or external peripheral display devices.

Thus, the various components, subsystems, or modules of the monitoring system 20, such as the controller 28 or logic subsystem 38 may be implemented in hardware, software, or a combination thereof, as described in more detail herein. Additionally, the processes, methods, and/or algorithms described herein may be performed using one or more processors, processing machines or processing circuitry to implement one or more methods described herein.

Figure 2:
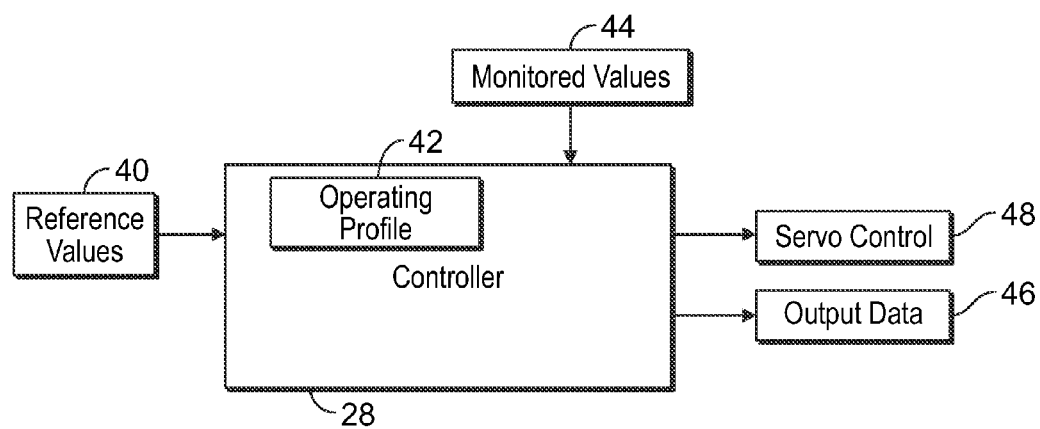
FIG. 2 is a block diagram of a controller of the monitoring system of claim 1.

As shown in FIG. 2, the controller 28 is configured to receive reference values 40 as inputs that are used to generate operating profiles 42 as described herein. In one embodiment, the controller 28 is a System for Machine Automation Control (Sysmac) NJ controller available from OMRON. However, it should be noted that in other embodiments, different types of controllers or PLCs may be used. Additionally, in various embodiments, the servo units 22 are G5 series servo drivers or servomotors available from OMRON that provide direct connection to the NJ controller via Ethernet for Control Automation Technology (EtherCAT). It should be appreciated that other servo devices may be used (such as available from Mitsubishi or Allen-Bradley) and communication may be provided using different standards or protocols, such as a Carrier Comfort Network (CCN). In various embodiments, the servo units 22 may drive permanent magnet motors. However, variations are contemplated, such as using inverters (instead of servos) that drive A/C or induction motors.

One or more operating profiles 42 may be generated for the one or more servo units 22 (shown in FIG. 1) that define the operating characteristics for the servo units 22, which may be based on the particular operation to be performed, such as the object or part to be moved using the servo units 22. For example, a different operating profile 42 may be generated for each of the servo units 22, such as based on the operating limits of the corresponding servomotors 26. In some embodiments, different operating profiles 42 are generated based on the part to be moved by the servomotor 26, which may be different parts for different automobile types. The operating profiles 42 generally define the operating characteristics for each of the servo units 22, which may include, but is not limited to, start-up torque/speed/position, torque/speed acceleration, steady state or operating torque/speed/position, and/or torque/speed deceleration. It also should be noted that the operating profiles 42 may be changed over time, such as based on changing operating characteristics of the servomotor 26 (e.g., loss of power over time).

The controller 28 also receives monitored values 44 from the one or more servo components or devices as described herein and performs monitoring operations. For example, the monitored values 44 may be compared to the operating profile 42, which includes defined threshold values and generates output data 46, which may be presented to a user, such as displayed on the display 32 (shown in FIG. 1). If a notification is to be provided, such as when the monitored values 44 approach or exceed threshold values (e.g., reference torque values), a visual notification of the condition, such as a warning, may be displayed on the display 32 or provided as an audible output using the audible output device 34 (shown in FIG. 1). Additionally in some embodiments, a servo control output 48 may be provided, for example, to automatically change the operation of the servomotor 26 when the monitored value 44 exceeds the reference value 40 (e.g., slow operation or halt operation).

Figure 3:
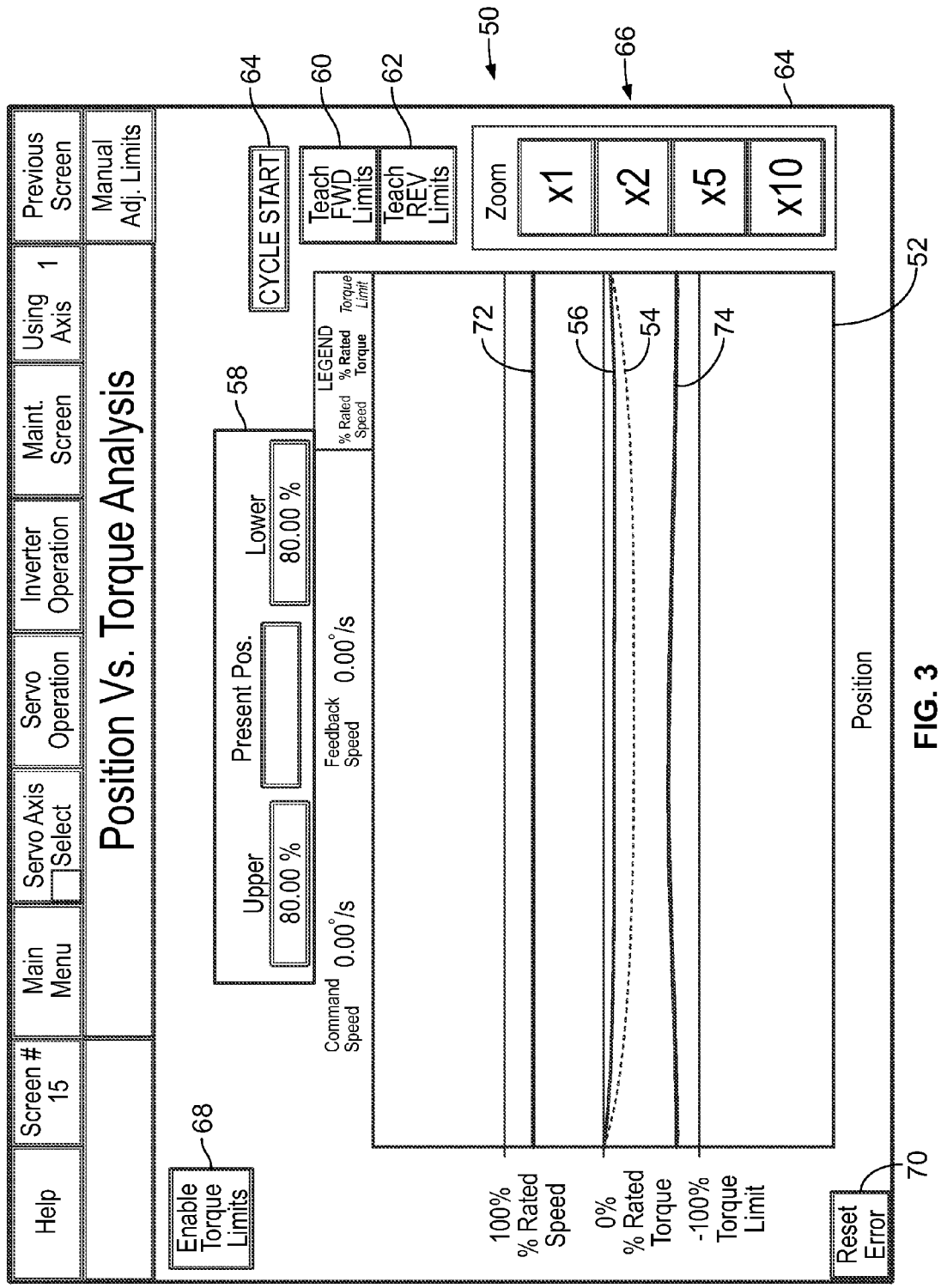
FIG. 3 is an illustration of a user interface in accordance with an embodiment.

In various embodiments, a user interface 50 may be presented on the display as shown in FIG. 3. In the illustrated embodiment, the user interface 50 includes a graph 52 that displays operating data, which in this embodiment is monitored speed and torque data represented by the curves 54 and 56, respectively, plotted based on position of the servo unit 22. The curves 54 and 56 may correspond to different measured or monitored values, which in this embodiment correspond to a percentage of rated torque and a percentage of rated speed, respectively, versus position. For example, the curves 54 and 56 represent the percentage value of torque or speed relative to a maximum operating torque or speed. Additionally, threshold values 72, 74 based on reference values may be displayed, such as lines on the graph 52, which may represent upper and lower threshold values, respectively. The threshold values 72, 74 may be for the speed data and/or the torque data 54, 56. Different threshold values 72, 74 may be provided for the speed data 54 and for the torque data 56. Optionally, the threshold values 72, 74 may be a percentage of the maximum value (e.g., 80% of the maximum value). In other various embodiments, the threshold values 72, 74 may be variable based on other characteristics, such as the position, the speed, the torque and the like. In some embodiments, the threshold values may be set based on a known good operation. For example, the threshold values may be trained by the servo training unit by running the process and setting the threshold values based on the measured values for the known/good operation (e.g., +20% and −20% buffer above and below the measured values).

The user interface 50 also includes numerical data 58, illustrated as positional data for the servo unit 22 (shown in FIG. 1). For example, in this embodiment, an upper and lower percentage position form a defined position is displayed along with the present position.

The user interface 50 also includes user selectable elements or members (e.g., displayed virtual buttons) that may be selected by a user, such as with a mouse or other input device (e.g., touching a touchscreen). In the illustrated embodiment, user selectable elements 60 and 62 may be selected by a user to define forward and reverse limits that define the thresholds as described herein. For example, by selecting the user selectable elements 60 and 62, a user is able to enter defined threshold limits for the torque, speed, or position for one or more of the servo components. It should be noted that upon selection of one of the user selectable elements 60 and 62, a separate screen, pop-up window, or text entry box may be displayed for entry of the threshold values. The forward and reverse limits correspond to defined forward and reverse directions of operation.

As one example, a user may program the forward and reverse limits at any point along a travel path at which the servo units 22 are to be controlled. The limits for the forward and reverse directions may be the same or different. For example, if in the forward direction a part is being moved and in a reverse direction the part has been removed, the forward and reverse limits are different. In operation, a user may run a particular servo operation a number of times (e.g., 4 or 5 times), such as by selecting the cycle start user selectable element 64, and view the operating waveform or characteristic of the particular servo unit 22. Thereafter, the user may program the controller 28 (shown in FIGS. 1 and 2) to one or more values above and below the observed waveform by selecting the user selectable elements 60 and 62. For example, a user may program a value that is above and below the maximum peak and minimum valley of the curves 54 and 56 as the threshold limits (e.g., 5% above and below). In other various embodiments, the user may program threshold values or the controller 28 may automatically program threshold values that follow the operating waveform (e.g., +20% and −20% buffer above and below the operating waveform, however any buffer values may be selected in various embodiments). It should be noted that the threshold values may be manually changed at different times by the user.

As one example, the acceleration torque may be observed at 60% of rated torque and the running torque observed as 30% of rated torque. As one example, reference torque values of 65% of rated torque and 25% of rated torque may be set by the user. The values may be set such that a threshold curve is defined above and below the location of the observed operating curves. In some embodiments, this setting of the threshold limits defines a teaching operation. It should be noted that different threshold limits may be defined for different operating conditions, such as based on the type of vehicle being moved. For example, a minivan and compact car have different weights and accordingly the threshold values are correspondingly adjusted and saved, for example, in the memory subsystem 30 (shown in FIG. 1). In some embodiments, once the threshold limits are set for a particular vehicle, a user may enter the vehicle type (such as via the user interface 50) and the threshold values are automatically populated. However, the values may be adjusted as desired or needed.

The controller 28 also may analyze trends in the monitored data values over time to predict likely changes in the operating values, for example, operating torques. For example, based on an increase in acceleration torque needed as the servomotor 26 (shown in FIG. 1) ages, the controller 28 may extrapolate or estimate the time at which the operating torque value will approach or exceed the threshold values and may determine a maintenance schedule for the servo unit 22 based on the operating values. As a result, preventative maintenance or replacement of, for example, the servomotor 26 may be performed. The analysis to predict the operating values may be performed, for example, using different mathematical and modeling methods known in the art.

Additional user selectable elements may be provided, such as the user selectable elements 66 that allow for zooming or magnifying the displayed data. For example, as user may want to view a particular portion of the curve 54 or 56 in more detail. In the illustrated embodiment, an enable torque limits user selectable element 68 is provided to enable monitoring operation of the controller 28 based on the defined threshold values that have been set as described herein. Additionally, a reset error user selectable element 70 is also provided to reset the displayed information, such as in the event of error.

In operation, the monitoring system 20 allows, for example, for monitoring of servomotors on a production line in real-time to provide different diagnostic information and allow for different types of operations to be performed, such as predictive and/or preventative maintenance. For example, the controller 28 may be configured or programmed (e.g., programming the PLC) and optimized to operate on different communication platforms, such as the ultra-fast EtherCAT communications protocol.

In various embodiments, increased processing speeds and real-time communications capabilities may be provided to build cars faster and less expensively by predicting and preventing the component failures that can cause costly and unplanned downtime. For example, instead of manually monitoring variables such as torque and velocity to reduce failures on the production line, such as by taking a periodic snapshot of the operating performance or characteristics, such as on a monthly basis, real-time monitoring is provided in accordance with various embodiments. The real-time monitoring allows for identification of changes in these variables and/or the relationships between the variables that can be indicative, for example, of an imminent and expensive failure in a component. In various embodiments, the monitoring system 20 monitors these variable and/or similar operational variables accurately, continually, and in real time to allow for example, prediction of part failure that then may be preventively replaced under controlled conditions during regular maintenance rather than waiting for a catastrophic failure. In addition, various embodiments allow for quicker diagnosis of the source of a failure when the failure does occur, so that repairs can be implemented even faster.

By practicing one or more embodiments, improvements to the metrics of Mean Time Between Failures (MTBF) and Mean Time to Repair (MTTR) may be provided to reduce costly downtime. In some embodiments, the controller 28, integrated in the machine automation PLC, is programmed to provide customized advanced diagnostic capabilities including real-time monitoring of variables including speed, torque, vibration, motor temperature, fan speed, and capacitor conditions on the servo drives to monitor end of life (EOL) status. It should be noted that other variables may be monitored based on information received from the servo drives. The real-time operational information helps operators reduce downtime and increase productivity on the line. For example, as described herein, users can set high and low limits, and program warning alarms or automatically stop the line entirely if and when a variable or variable ratio reaches a pre-selected point. In addition, step-by-step repair procedures may be provided, such as instructions that are viewable on-screen, such as on the display 32. In various embodiments, users then do not have to locate hard copies of manuals for repair issues, but which are instead provided on an HMI. Thus, various embodiments provide monitoring operation that allows for performing predictive maintenance.

Figure 4:
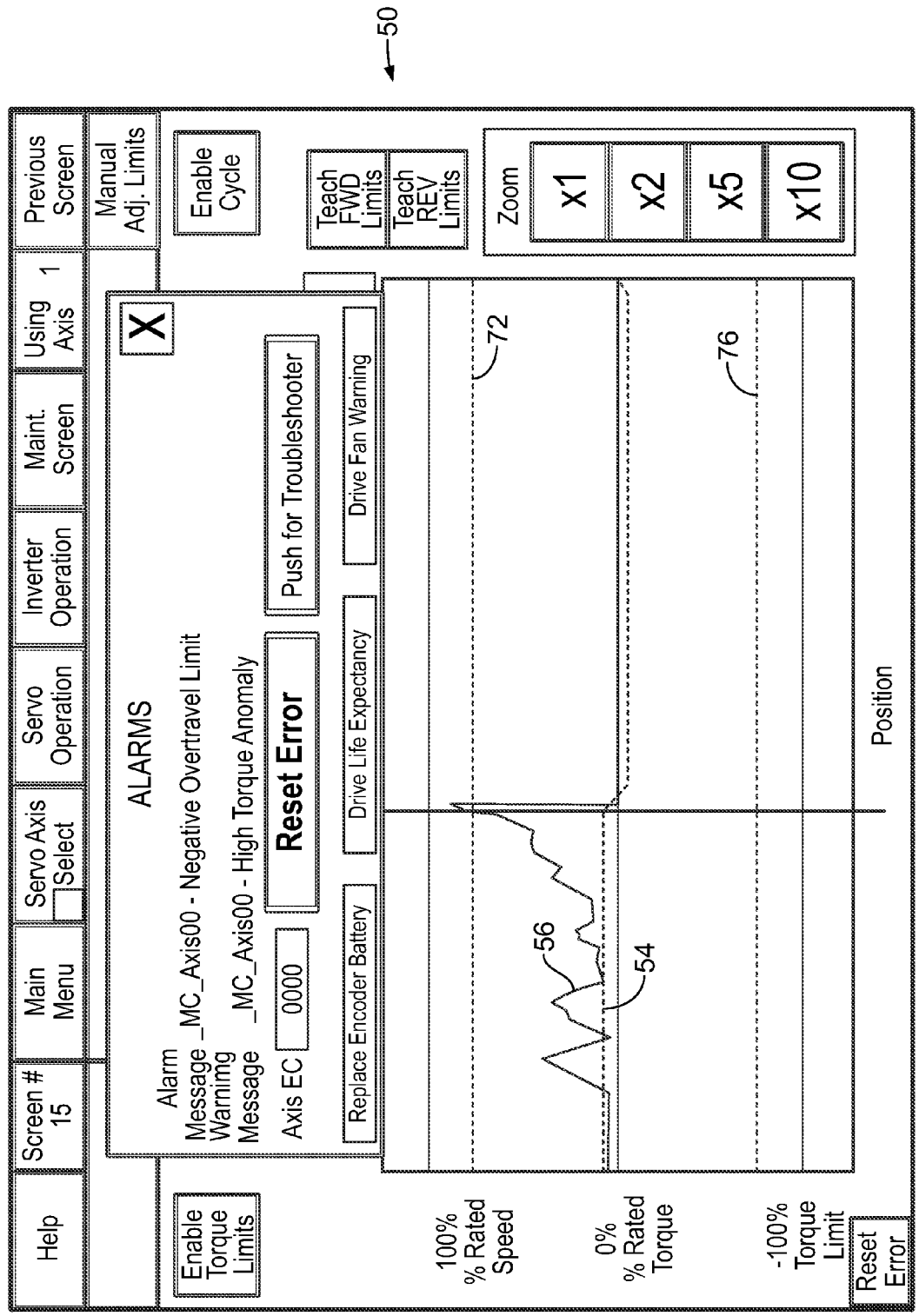
FIG. 4 is an illustration of the user interface in accordance with an embodiment.

As shown in FIG. 4, the monitoring system 20 monitors operation of the servo units 22, such as one or more operating limits or boundaries (e.g., torque threshold limits or ranges), and determines whether one or more servos units 22 are within the limit boundaries 72, 74. FIG. 4 shows an example when a torque out of range condition exists. The controller 28 monitors the servo unit 22 to determine when the operational torque 56 is out of tolerance (e.g., exceeds the upper threshold value 72). The operational data 56 for the servo unit 22 is displayed to a user (e.g., graphed on the HMI for visual indication). A notification is provided, such as in the form of an audible and visual alarm. In an exemplary embodiment, the controller 28, after the alarm condition is detected, automatically controls operation of the servo unit 22, such as by slowing or halting the servo unit 22 to a safe operational level, which may cause the torque to return to acceptable or safe levels.

Figure 5:
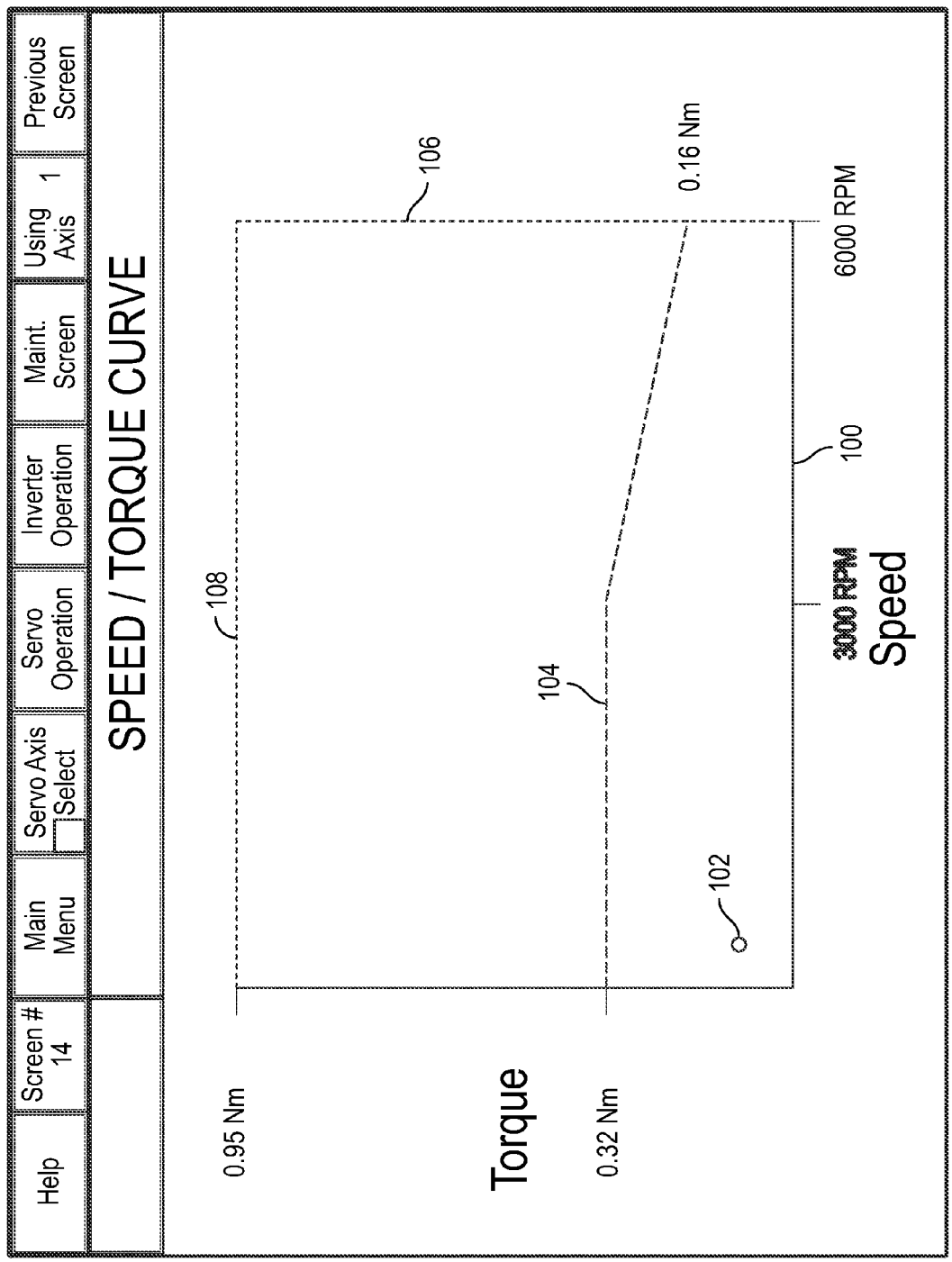
FIG. 5 is an illustration of the user interface in accordance with an embodiment.

As shown in FIG. 5, the user interface 50 may present a graph 100 that displays operating data showing monitored speed and torque data. The graph 100 shows a value 102 representing the current torque and the current speed of the servo unit 22. The graph 100 also shows an expected line 104 representing an expected torque versus speed profile as a reference for the operator. The line 104 may have any shape and may be different for different servo units 22. The line 104 may be manually set by the user or automatically trained by the system based on "good" machine cycle and stored in memory. The line 104 may be set based on historical data, the operation being performed, the operating characteristics for the servo unit 22, which may include, but is not limited to, position, start-up torque/speed/position, torque/speed acceleration, steady state or operating torque/speed/position, and/or torque/speed deceleration, and the like. Additionally, threshold speed and torque values 106, 108 may be displayed, which may represent upper and lower threshold values for speed and torque, respectively. The threshold values 106, 108 are shown as vertical and horizontal lines; however the threshold values 106, 108 may have other orientations in alternative embodiments.

Figure 6:
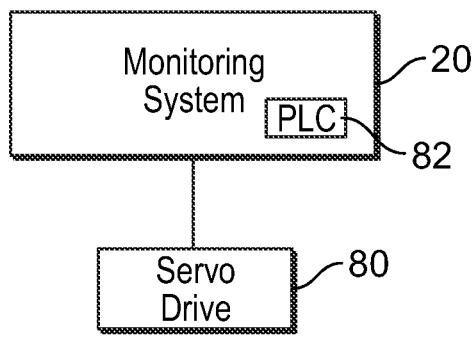
FIG. 6 is a block diagram illustrating a communicative coupling of the monitoring system of FIG. 1 in accordance with an embodiment.
Figure 7:
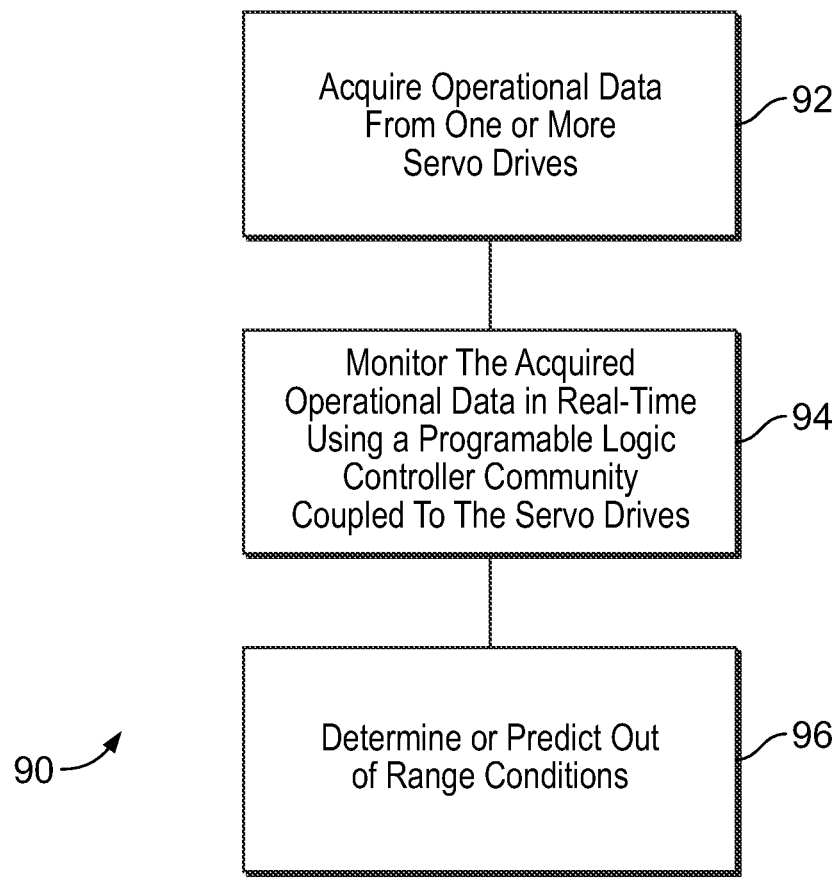
FIG. 7 is a flowchart of a method in accordance with an embodiment.

As shown in FIG. 6, the monitoring system 20 in some embodiments includes a PLC 82 (which may be embodied as or form part of the controller 28 shown in FIG. 1) that is programmed to monitor one or more servo drives 80 (which may be embodied as or form part of one or more of the servo components shown in FIG. 1). As examples, the servo drive 80 may be any drive that controls motor operation in a manufacturing assembly process, such as when parts are moved in different directions (e.g., vertical or horizontal movement). For example, in an automotive application, the servo drive 80 may be used in combination with a welding transfer machine, a servo press, a lifter or drop lifter, among many other machines and components. For example, the servo drive 80 may be used as part of any portion of one or more assembling or machining stations along a production line, such as a vehicle production line. The monitoring system 20, for example, may form part of a production management system, such as described in U.S. Pat. No. 5,088,045 or a workpiece assembling method as described in U.S. Patent Application Publication 2011/0179627. The monitoring system 20 may monitor any drive component, for example, one or more servo drives 80 at any location or portion in the production or assembly process. The monitoring system 20 may be used in connection with, for example, any type of industrial or assembly-type operations, such as automotive production lines, that may include a number of assembling or machining stations. During operation, one or more workpieces, such as parts of a vehicle to be assembled or machined are moved along the production line with transport units that can move in one or more different directions. In various embodiments, the servos used when moving the transport units have operating limits as described herein and operational data is monitored with respect to the operating limits.

In one embodiment, a monitoring method 90 as illustrated in FIG. 5 is provided, such as for monitoring a servo system that includes one or more servo components or servo drives. The method 90, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 90 may be able to be used as one or more algorithms to direct hardware to perform operations described herein.

The method 90 includes acquiring operational data from one or more servo drives at 92. For example, in some embodiments the operational data is acquired using a programmable monitoring device communicatively coupled to the one or more servo drives. In these embodiments, the operational data is acquired directly from the servo drives without use of an external device or sensor (and without the use of manual measurements). For example, the servo drives in one or more embodiments are configured to acquire operational data for the servo drives that is then communicated from the servo drives to the monitoring system, which may be located remote therefrom. For example, a communication link may be established with the servo drive to acquire the operational data for that servo drive, such as, but not limited to speed, torque, vibration, motor temperature, fan speed, and capacitor conditions on the servo drives. However, in various embodiments, any information or operational data measured or obtained by the servo drives may be acquired for use in monitoring as described herein.

The acquired operational data, which may be stored in the servo drive, is then monitored in real-time at 94 to thereby provide monitoring of the servo drive. In particular, a programmable monitoring device, such as a PLC, which is communicatively coupled (which may be a wired or wireless connection) to the one or more servo drives, receives the operational data and monitors the data as described in more detail herein. For example, the values for one or more different variables relating to the operational data are monitored during operation of the one or more servo drives. Thus, real-time monitoring may be provided by receiving and monitoring the operational data while the servo drives are operating. For example, in various embodiments, the operational data is not stored and later monitored, but instead is monitored as the operational data is measured or sensed at the one or more servo drives. The operational data may be communicated to the programmable monitoring device continuously or at one or more time intervals, such as based on the speed of the communication link between the one or more servo drives and the programmable monitoring device. It should be noted that the operational data may be communicated at different speed, at different times, and/or using different protocols as desired or needed.

The method 90 also includes determining or predicting out of range conditions at 96. For example, as described in more detail herein, based on one or more threshold values, a determination may be made as to whether monitored operational data is approaching or exceeding a threshold value, such as a threshold reference value, which may be based on an operating profile. The determination may be based on current operating conditions or may be based on predicted future operating conditions. The monitored information, as well as the determined or predicted out of range conditions may be presented to a user visually. In some embodiments, an audible notification may be provided for some events, such as a determined out of range condition.

It should be noted that in various embodiments an HMI is provided to allow visualization of the monitored data and modification of different parameters, which may be embodied, at least in part, as the user interface 50 (shown in FIG. 3). The HMI allows for setting or modifying one or more parameters related to the monitoring performed in accordance with one or more embodiments, such that one or more different trigger events may be defined. For example, different communication parameters may be set or selected by the user or different limits for monitored data may be set or modified, including different offset values as described herein. Additionally, the user may set or select the particular operating data to be acquired and/or monitored with respect to the one or more servo drives. The monitored data also may be weighted or scaled, for example, based on the type of data. Thus, customized monitoring of the one or more servos or servo drives may be provided.

In some embodiments, different tests may be performed to ensure that the data received is reliable, such as based on the timing of the data and variance in the received data (e.g., variance in monitored values within a defined time window). In some embodiments, data that is determined not reliable is discarded.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules, systems, or units (or aspects thereof) may be combined, a given module or unit may be divided into plural modules (or sub-modules), systems (or subsystems), or units (or sub-units), a given module, system, or unit may be added, or a given module, system, or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "system," "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, or course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A feedback control system comprising:
   at least one servo unit controlling operation of a motor, the at least one servo unit configured to acquire operational data with respect to controlling the operation of the motor; and
   a programmable logic controller communicatively coupled to the at least one servo unit, the programmable logic controller configured to:
   generate an operating profile for the at least one servo unit, wherein the operating profile defines a threshold curve including a plurality of threshold values, each threshold value of the plurality of threshold values being associated with a position of the motor;
   receive the operational data from the at least one servo unit, the operational data including at least one of a torque condition and a speed condition for the at least one servo unit;
   output real-time data corresponding to the operational data; and
   predict a time at which the at least one of the torque condition and the speed condition will exceed at least one of the plurality of threshold values of the threshold curve.

2. The feedback control system of claim 1, wherein the programmable logic controller is configured to control operation of the at least one servo unit.

3. The feedback control system of claim 1, wherein the programmable logic controller is configured to generate a notification when the operational data indicates an exceedance of at least one of the plurality of threshold values.

4. The feedback control system of claim 1, wherein the programmable logic controller receives a user input reference value for setting the threshold curve.

5. The feedback control system of claim 1, wherein the programmable logic controller automatically generates the threshold curve based on a known acceptable operation cycle of the corresponding servo unit.

6. The feedback control system of claim 1, further comprising a display, wherein a user interface is displayed on the display and presents a graph of the real-time data corresponding to the operational data.

7. The feedback control system of claim 6, wherein the graph includes the threshold curve, the programmable logic controller generates a notification when the operational data exceeds at least one of the plurality of threshold values.

8. The feedback control system of claim 6, wherein the user interface includes user selectable elements selectable by a user to define the threshold curve for at least one of a torque, a speed or a position of the corresponding servo unit.

9. The feedback control system of claim 8, wherein the programmable logic controller causes the servo controller to change operation of the servo unit when the operational data exceeds at least one of the threshold value.

10. The feedback control system of claim 1, wherein the servo unit comprises a servo controller, the programmable logic controller being operably coupled to the servo controller.

11. The feedback control system of claim 1, wherein the programmable logic controller is configured to determine a maintenance schedule for the servo unit based at least partially on the predicted time at which the at least one of the torque condition and the speed condition will exceed at least one of the plurality of threshold values.

12. The feedback control system of claim 1, wherein the motor is coupled to a component of a vehicle assembly line.

13. The feedback control system of claim 1, wherein the operational data further includes at least one of position, vibration, motor temperature, fan speed, and capacitor conditions for the at least one servo unit.

14. The feedback control system of claim 1, wherein the programmable logic controller is further configured to:
receive an input indicative of an automotive part to be moved by the motor; and
generate the operating profile based on the automotive part to be moved by the motor.

15. A monitoring method comprising:
acquiring operational data directly from at least one servo unit controlling operation of a motor, the operational data including at least one of a torque condition and a speed condition for the at least one servo unit;
generating an operating profile for the at least one servo unit, wherein the operating profile defines a threshold curve including a plurality of threshold values, each threshold value of the plurality of threshold values being associated with a position of the motor;
monitoring the at least one servo unit using a programmable logic controller associated with the at least one servo unit in real-time using the acquired operational data; and
predicting, using the programmable logic controller, a time at which the at least one of the torque condition and the speed condition will exceed at least one of the plurality of threshold values of the threshold curve.

16. The method of claim 15, further comprising determining an out of range condition for the at least one servo unit based on the monitoring.

17. The method of claim 15, further comprising the programmable logic controller controlling operation of the servo unit based on the acquired operational data.

18. The method of claim 15, further comprising displaying a user interface on a display including a graph of real-time data corresponding to the operational data, the graph including the threshold curve.

19. The method of claim 18, wherein said displaying further comprises displaying a notification when the operational data indicates an exceedance of at least one of the plurality of threshold values.

20. The method of claim 15, further comprising the programmable logic controller storing the threshold curve and the programmable logic controller generating a notification when the operational data exceeds at least one of the plurality of threshold values.

* * * * *